(12) United States Patent
Tsao

(10) Patent No.: US 8,868,690 B2
(45) Date of Patent: *Oct. 21, 2014

(54) SYSTEM AND METHOD FOR SUPPORT WIRELESS DEVICE ACCESS TO EXTERNAL STORAGE

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,831

(22) Filed: Nov. 14, 2013

(65) Prior Publication Data
US 2014/0089360 A1    Mar. 27, 2014

Related U.S. Application Data

(63) Continuation of application No. 10/726,897, filed on Dec. 4, 2003, now Pat. No. 8,606,880.

(51) Int. Cl.
*G06F 15/16* (2006.01)
*G06F 17/30* (2006.01)
*H04L 29/08* (2006.01)

(52) U.S. Cl.
CPC .... *G06F 17/30194* (2013.01); *G06F 17/30067* (2013.01); *H04L 67/06* (2013.01); *H04L 67/1097* (2013.01); *H04L 67/02* (2013.01); *H04L 67/2842* (2013.01)
USPC ............................ 709/219; 709/203; 455/899

(58) Field of Classification Search
USPC ......................... 709/219, 203, 226, 220, 200; 455/412.1, 899
See application file for complete search history.

(56) References Cited

U.S. PATENT DOCUMENTS

| | | | |
|---|---|---|---|
| 2002/0133597 A1* | 9/2002 | Jhingan et al. | 709/228 |
| 2003/0072031 A1* | 4/2003 | Kuwata et al. | 358/1.15 |
| 2004/0186750 A1* | 9/2004 | Surbey et al. | 705/4 |

* cited by examiner

*Primary Examiner* — El Hadji Sall

(57) ABSTRACT

To meet the needs for storing larger volume personal information for user of wireless device, it is desire to provide extra storage space to the wireless device such as for cell phone etc due to the limited storage space that the wireless device has. Instant application disclosed a system and method for the wireless device to efficiently and effectively use remotely located storage space provided by a server.

20 Claims, 4 Drawing Sheets

Wireless devices supports in a simple environment

Wireless devices supports in a simple environment

SYSTEM AND METHOD FOR SUPPORT WIRELESS DEVICE ACCESS TO EXTERNAL STORAGE

CROSS REFERENCE TO PRIOR APPLICATION

This invention is a continuation application of the U.S. patent application Ser. No. 10/726,897 filed on Dec. 4, 2003, which relates to a provisional application No. 60/401,238 of "Concurrent Web Based Multi-task Support for Control Management System" filed on Aug. 6, 2002. This invention also relates to a provisional application No. 60/402,626 of "IP Based Distributed Virtual SAN" filed on Aug. 12, 2002. All mentioned prior applications are herein referenced incorporated by reference in their entirety for all purpose.

FIELD OF THE INVENTION

This invention focuses on how a wireless device can actually use external storage provided by a storage server.

BACKGROUND INFORMATION

Terminology:

The terminologies described in next few sections reflect the scope and are part of present invention.

The Internal Storage of a System:

The storage media such as hard disk drives, memory sticks, memory etc. is connected to a system directly through bus or a few inches of cable. Therefore, the storage media actually is a component of the system in an enclosure.

The External Storage of a System:

The external storage media is not a component of the system in a same enclosure. Therefore, they have to be connected through a connecting medium (e.g. a cable) such as Ethernet cable for IP based storage, Fiber channel cable for fiber channel storage, or such as wireless medium and etc. The storage media of an external storage could be magnetic hard disk drives, solid state disk, optical storage drives, memory card, etc. and could be in any form such as Raid, which usually consists of a group of hard disk drives.

The Storage Partition, its Volumes, and the Corresponding File System:

To effectively use storage system, each storage device usually needs to be partitioned into small volumes. After the partition, each of the volumes can be used to establish a file system on it. To simplify the discussion herein, the term of the storage volume, its corresponding file system, and the term of the partition of the storage device are often used without differentiation.

CCDSVM:

It is an abbreviation for a central controlled distributed scalable virtual machine system. The CCDSVM allows a control management station to control a group of systems and provide distributed services to a client system on the Internet, the Intranet, and an LAN environment.

ISP & ASP:

The ISP refers to Internet service provider and the ASP refers to application service provider.

FIGURES

FIG. 1 illustrates an embodiment of the instant application, the FIG. 1 is the same as FIG. 1 of the previous application of the "Concurrent Web Based Multi-task Support for Control Management System" with an exception of replacing a console host with a wireless device.

FIG. 2 is the same as FIG. 1 of the above except that it shows a more detailed storage system controlled by a server. In addition, multiple wireless devices are presented for access to the storage system.

FIG. 3 shows a scheme of a wireless device downloading contents from an ISP/ASP or other web sites to an external storage allocated for the wireless device.

FIG. 4 similar to the FIG. 1 of the previous application of the "IP Based Distributed Virtual SAN" with exception that each IP storage server provides a file system as external storage for each of the wireless devices instead of providing IP based virtual SAN service. Also, each host in said FIG. 1 actually is replaced by a wireless device of FIG. 4.

Unless specified, the programming languages and the protocols used by each software modules of instant application, and the computing systems used in this invention are assumed to be the same as described in the mentioned previous patent applications.

In addition, in the drawing, like elements are designated by like reference numbers. Further, when a list of identical elements is present, only one element will be given the reference number.

BRIEF DESCRIPTION OF THE INVENTION

Today the wireless users commonly face a problem of lack of storage capacity configured on their wireless devices such as cell phone or PDA, which are usually limited to 256 MB for PDA and much less for cell phone. To effectively solve this problem and let users own multiple gigabytes (GB) of storage for their wireless devices as well as allowing the users to use the GB storage for their multimedia applications, the storage of a server can be used as the external storage for the wireless devices. This technology has been briefly introduced in the previous parent patent applications.

Now let us examine how the external storage can actually be used by the wireless devices. First, let each server unit (e.g. the server 3 of the FIG. 2) partitions its storage system into volume and each of the volumes will have multiple GB in size. Therefore, each user of the wireless devices can be exclusively assigned and access a specific storage volume. For example, if we need to provide each user a 4 GB storage space, then a 160 GB disk drive can support 40 users. Therefore, a 4096 GB storage system on the server unit can support a total of 1024 wireless devices for users. Further, any data on the wireless device can be transmitted to an assigned storage volume. In addition, the user of the wireless device also can download the multimedia data from an ISP or ASP to the assigned storage volume of a designated server unit through out-band approach shown in FIG. 3. Finally, the user can use a web-browser, which has a functionality of invoking embedded video or music, to enjoy his/her stored multimedia contents.

These and other futures, aspects and advantages of the present invention will become understood with reference to the following description, appended claims, and accompanying figures.

Figure 1:
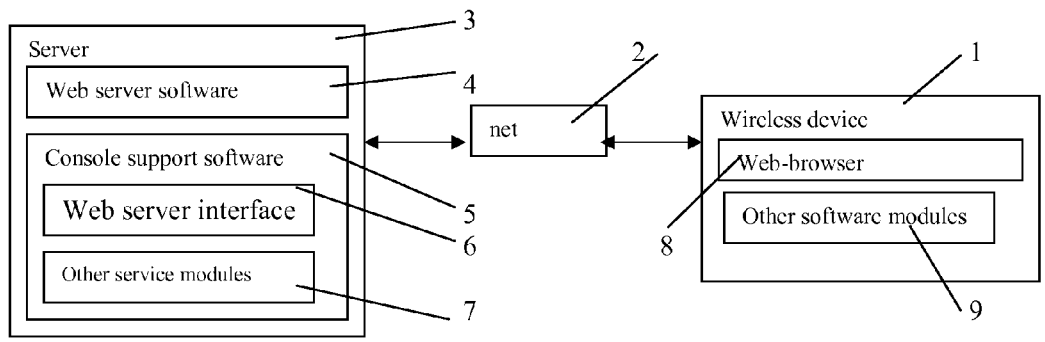
Referring now to FIG. 1, it demonstrates a configuration comprising a network connecting a wireless device and a server.

In the FIG. 1, Net (2) represents a communication link, which may be combined with wireless and wired connection media and guarantee that the communication packets can be sent/received between the wireless device and the server. It is also assumed that the net (2) representing an communication infrastructure is built up in such way that a user of a wireless device can access and browse any web-site on the Internet, the Intranet, or a local area network (LAN).

In FIG. 1, the console support software (5) on the server (3) can be configured to support web-based multi-tasks for the user of the wireless device (1) via a web browser 8. Further, the user of the wireless device is able to perform creating structured layered files directories or folders, and perform data management operations, such as delete, move, copy, rename for data files or folders/directories and etc. on an assigned storage volume associated with the server (3).

In addition, the other software modules (9) of the wireless device (1) is configured to send data to or receive data from the other service modules (7) running on the server (3) via communication link (2) through a suitable IP or non-IP based protocol. The data being sent cold be a digital photo picture, a message and etc.

Also, the console supporting software (5) of the server (3) and the other software modules (9) of the wireless device (1) can be implemented with any suitable languages such as C, C++, Java, etc. depending on the implementation.

Besides, the web-browser (8) of the wireless device (1) can be implemented any suitable software. The web browser is configured to communication with web server software (4) on the server (3) with any other web server through the HTTP protocol.

Figure 2:
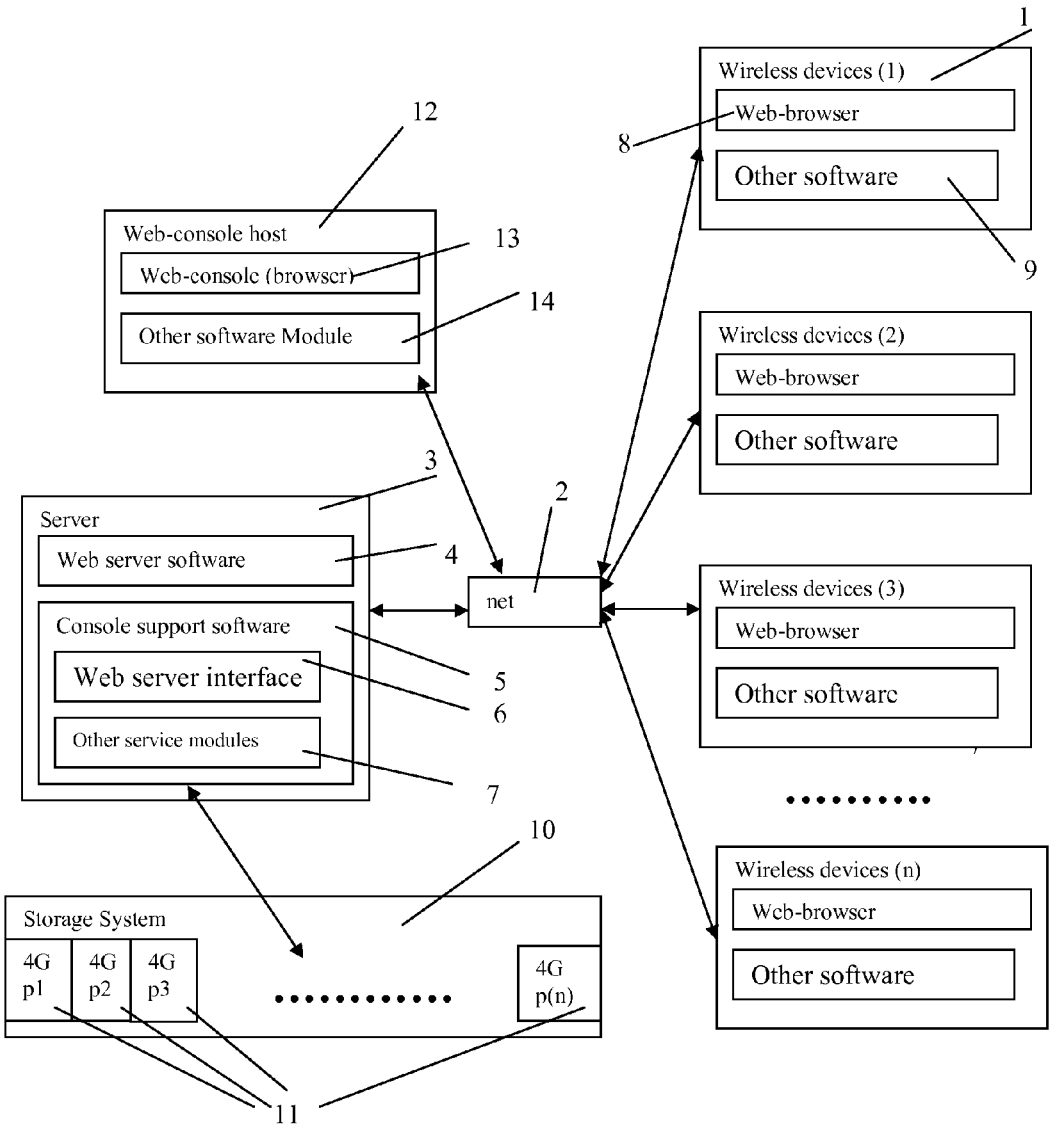

On the other hand, FIG. 2 has demonstrated that the storage system 10 of a server 3 can be allocated to multiple wireless devices.

First, the storage system (10) of the server (3) can be partitioned into multiple storage volumes (11) by administration staff through a web-console (13) of a console host (12).

Second, the storage system (10) of the server (3) can be partitioned in such way that each of the wireless devices can be allocated with a storage volume having a desired size, therefore, the server 3 can support maximum numbers of the wireless devices.

In addition, the storage connection media could be any kind of cables, such as SCSI cable, IP cable, Fiber cable etc. or could be wireless communication media. The storage system itself could be various types.

Finally, the storage system 10 can be accessed by each of the wireless devices through IP or non-IP based network and protocols.

Figure 3:
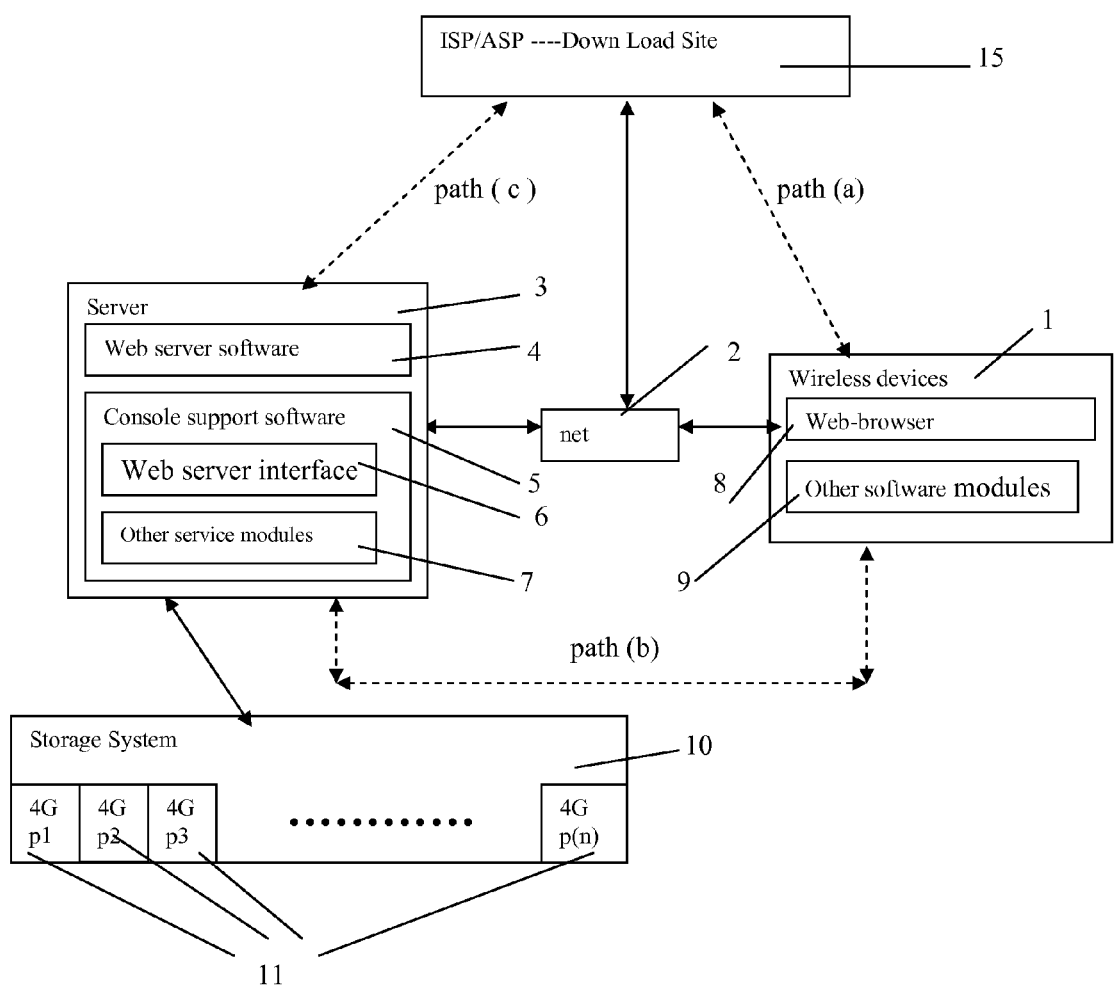
Figure 4:
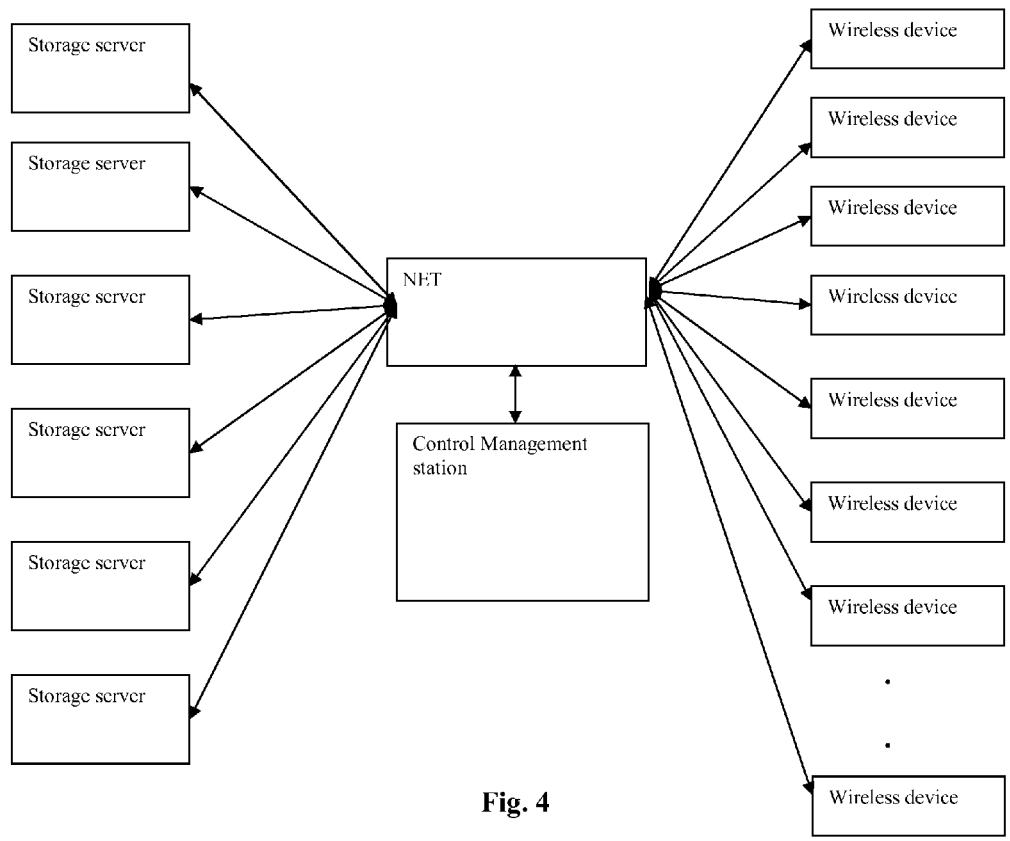

FIG. 3 has demonstrated that a user from a web-browser (8) on a wireless device (1) can download data from a known web-site (15) to his/her allocated external storage (10) on the server (3). The dash-lined path (a) represents a communication channel between the wireless device (1) and a remote downloading web-site (15) that provides downloading contents. The dash-lined path (b) represents a communication channel between the wireless devices (1) and the storage server (3). The dash-lined path (c) represents a communication channel between the server 3 and the remote web-server (15).

THE DETAILED DESCRIPTION OF THE INVENTION

The Use of the External Storage by the Wireless Device:

The FIG. 2 shows a simplified diagram of the wireless devices (1) using the external storage system (10) of the server (3) for effectively resolving the storage limitation problem for the wireless devices (1).

Partition Storage Volumes (FIG. 2)

With this invention, the entire storage (10) on the server (3) needs to be partitioned into suitable size of volumes (11) such as 4 GB for each volume. This will allow the server 3 to serve maximum number of the wireless devices (1). With the web console support software (5) of the server (3), tasks of partitioning the storage system 10 can be done through a web-console (13) on a console host (12) by an administrative staff.

In order to support storage partitioning, first the console support software (5) of the server (3) must send storage information of the server (3) to the web-console (13) of the console host (12). The storage information includes each storage device's name and total size etc. Second, based on the received storage information the administration staff on the console host (12) can use a web-console (13) to fill out a request and send the request for storage partition information to the console support software (5) of the server (3). The storage partition information includes the number of the partitions (volumes) and the size of each partition (volume). Third, upon receiving the request of storage partition information from the web-console (13 of FIG. 2) of the console host (12), the console support software (5) of the server (3) performs the actual storage partition to divide the entire storage into multiple small volumes. Finally, for each small storage volume, a corresponding file system could be built up.

Assign Storage Volumes (FIG. 2):

Each of the storage volumes together with its corresponding file system (11) on the storage system (10) of the server (3) needs to be exclusively allocated and exported to a specific wireless device (1) by the console support software (5) of the server (3).

Data and Storage Volume Management (FIG. 2)

With the support of the console support software modules (5) of the server (3), the user of the wireless device (1) can via the web-browser 8 of FIG. 2 setup folder/directory structure on the file system of his/her assigned external storage volume (11). In addition, the user of the wireless device (1) can via the web-browser 8 of FIG. 2 perform all data management operations such as delete, copy, move, rename etc. for file system.

In order to support such data management on the external storage (10) allocated to the wireless device (1 of FIG. 2) via the web-browser 8 of FIG. 2, first the console support software modules (5) of the server (3) must communicate with the web-browser (8) of the wireless device (1). Therefore, the user from the web-browser (8) of the wireless device (1) can choose desired data management operations and send operation information to the console support software modules (5) of the server (3). The mentioned operations include establishing folder/directory, copying, moving, or reaming data file etc. Second, upon receiving the data management operation, the console support software modules (5) of the server (3) actually processes/executes these requested operations for the assigned file system of an allocated storage volume (11) on the server (3).

Store Data from Wireless Device into External Storage (FIG. 2)

To store the data such as digital photo pictures or messages into the file system on the allocated storage (10) of the server (3), the other software modules (9) of the wireless device (1) need to send these data to the other service modules (7) of the server (3) via communication link between them. Upon receiving the data, the other service modules (7) of the server (3) write these data to the file system of the allocated storage volume (11) for the wireless device 1. The protocol used between these two communication entities could be either IP or non-IP based protocol.

Download Data from a Remote Web Server Site into Allocated Storage Volume

Now, referring to FIG. 3, If a user of the wireless device (1) wants to download a data from a remote web server (15) into the allocated file system (11) of the allocated storage volume (11) on the server (3), the following steps are required:

1) The user of the wireless device (1) via a web-browser (8) access to a remote downloading web server site (15) to obtain information for the downloading via path (a) of FIG. 3. For example, the user access to a web-page which contains the data name for the downloading.

2) The other software modules (9) of the wireless device (1) obtain the downloading information, which becomes available in the cached web-pages on the wireless device (1) after the web-browser (8) access to the web site (15).

3) The other software modules (9) of the wireless device (1) send the obtained downloading information to other service modules (7) of the storage server (3) via path (b) of FIG. 3.

4) Upon receiving the downloading information from the wireless device (1), the other service module (7) of the storage server (3) sends a web download request to the web-site (15) via path (c) of FIG. 3 and receives the downloading data streams from the web server of the web-site (15).

5) Upon receiving downloading data streams, the other service modules (7) of the storage server (3) write the data streams into the allocated file system (11) on the server (3) for the wireless device (1).

Retrieve Data from Allocated Storage for the Wireless Device

1) If a web-browser (8) on a wireless device 1 has embedded video or music functionality, a user of the wireless device (1) can use the browser to retrieve and play multimedia data file such as video or music stored in the allocated storage volume (10) located on the server (3).

2) If there is a needs, the other software module (9) of the wireless device (1) also can retrieve data file from the allocated file system of the allocated storage volume (11) on the server (3).

Support External Storage for a Large Number of the Wireless Devices

If there is a need to provide each user a 2 GB of storage space, then a 160 GB disk drive can support 80 users. A 4096 GB (4 Tera Bytes) storage system on the server unit can support 2024 user. Each of the server units only can efficiently support a limited size of the storage system. In order to support a large number of the wireless devices, such as for 500,000 wireless devices, a larger number of the servers is required, in this case 250 servers is required. In order to let a larger number of the servers to effectively support the larger number of the wireless devices, an infrastructure like CCDSVM is desirable, which has been described in previous patent applications. With the CCDSVM the control management station can control larger number of storage servers to provide external storage for a huge number of the wireless devices.

The invention claimed is:

1. A server providing storage space to wireless device, the server comprising:
    at least one storage device, and
    a storage medium comprising program code that, when executed by the server, causes the server to:
        allocate, via the at least one storage device, a storage space of a predefined capacity to a wireless device,
        create a folder structure residing in the storage space, wherein the storage space being remotely located with respect to the wireless device;
        establish a link for the wireless device access to the folder structure in the storage space; and
        couple with the wireless device for allowing a user thereof access to the folder structure in the storage space for storing a data object therein or retrieving a data object therefrom, the storing of a data object including to download a file from a remote web server directly into the storage space.

2. The server as recited in claim 1, wherein the access to the folder structure comprises: creating, from the wireless device, a folder in the folder structure.

3. The server as recited in claim 1, wherein the data object further is a message, or a multimedia data of video, digital music or photo picture.

4. The server as recited in claim 2, wherein the access to the folder structure comprises: storing, from the wireless device, a data object into the folder in the folder structure; or deleting or moving or copying or renaming, from the wireless device, a file or a folder in the folder structure.

5. The server as recited in claim 1, wherein the folder structure is created with multiple folders on a file system configured in the storage space accessible to the wireless devices.

6. The server as recited in claim 4, wherein the user of the wireless device is allowed via a web browser executed thereof to perform operation to the file or folder in the folder structure.

7. The server as recited in claim 1, wherein the link is wireless.

8. The server as recited in claim 1, wherein the downloading of a file comprises:
    obtaining download information for the file from the remote web server;
    transmitting the download information cached in the wireless device to the server; and
    causing the server in accordance with the downloading information to download the file from the remote web server directly into the storage space.

9. The server as recited in claim 7, further comprising: facilitating a console for an administrator of a service provider to partition the at least one storage device for allocating the storage space to the wireless device.

10. A server comprising:
    a plurality of storage devices;
    wherein at least a first one of the storage devices is configured with a storage space of a predefined capacity allocated to a wireless device and allow the wireless device via a wireless link access to the storage space, said access to the storage space including to store a data object therein retrieve a data object therefrom,
    wherein the storage space is remotely located with respect to the wireless device, and
    wherein the server is configured to couple with the wireless device for allowing a user on the wireless device to download a file from a remote web server directly into the allocated storage space.

11. The server as recited in the claim 10, wherein said downloading of a file comprises:
    obtaining download information for the file from the remote web server;
    transmitting the download information cached in the wireless device to the server; and
    causing the server in accordance with the downloading information to download the file from the remote web server directly into the storage space allocated to the wireless device.

12. The server as recited in claim 10, wherein the server coupled with the wireless device for allowing the user thereof performing an operation for a data object in the storage space, including to store a file or create a folder therein, or delete or move or copy or rename a file or a folder stored therein.

13. The server as recited in claim 10, wherein the data object further is a file.

14. The system as recited in claim 10, further comprising: at least a second one of the storage devices is configured with a storage space of a predefined capacity allocated to a wireless device and allow the wireless device via a wireless link access to the storage space.

15. The server as recited in claim 10, wherein the data object further is a message, or a multimedia data of video or digital music or photo picture.

16. A non-transitory computer-readable medium, residing in a server, comprising:
   program instructions that, when executed by the server, cause the server to:
      allocate a storage space of a predefined capacity for each of a plurality of wireless devices;
      establish a wireless link for the each of the wireless devices access to the storage space allocated; and
      couple with the each of the wireless devices for allowing a user thereof access to the storage space for storing a data object therein or retrieving a data object therefrom, the storing of a data object including to download a file from a remote web server directly into the storage space.

17. The computer-readable medium of claim 16, wherein said access to the storage space comprises: creating, from the each of the wireless devices, a folder in the storage space.

18. The computer-readable medium of claim 16, wherein the data object further is a message or a multimedia data of video, music, or picture.

19. The computer-readable medium of claim 17, wherein the access to the storage space comprises: storing, from the each of the wireless devices, a data object into the folder in the storage space; or deleting or moving or copying or renaming, from the each of the wireless device, a file or folder in the storage space.

20. The computer-readable medium of claim 16, wherein said downloading of a file further comprises:
   obtain, by the each of the wireless devices, the downloading information for the file from the remote web server;
   transmitting the downloading information cached in the each of the wireless devices to the server; and
   causing the server in accordance with the downloading information to download the file directly from the remote web server into the storage space allocated to the each of the wireless devices.

* * * * *

UNITED STATES PATENT AND TRADEMARK OFFICE
CERTIFICATE OF CORRECTION

Page 1 of 1

PATENT NO. : 8,868,690 B2
APPLICATION NO. : 14/079831
DATED : October 21, 2014
INVENTOR(S) : Sheng Tai Ted Tsao It is certified that error appears in the above-identified patent and that said Letters Patent is hereby corrected as shown below:

A) IN THE SPECIFICATION:

In col. 3, line 25, please delete the "implemented";
In col. 3, line 27, please replace "server (3)" with ---server (3) or---;

B) IN THE CLAIMS:

In col. 6, line 51, Claim 10, please replace the "retrieve" with ---or retrieve---.

Signed and Sealed this
Twenty-seventh Day of January, 2015

Michelle K. Lee
*Deputy Director of the United States Patent and Trademark Office*